(12) United States Patent
Wagener et al.

(10) Patent No.: US 11,827,176 B2
(45) Date of Patent: Nov. 28, 2023

(54) ELECTRONIC DOOR LOCKING SYSTEM

(71) Applicant: Volkswagen Aktiengesellschaft, Wolfsburg (DE)

(72) Inventors: Martin Wagener, Braunschweig (DE); Claus-Peter Brückner, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 141 days.

(21) Appl. No.: 17/622,934

(22) PCT Filed: Jun. 23, 2020

(86) PCT No.: PCT/EP2020/067437
§ 371 (c)(1),
(2) Date: Dec. 27, 2021

(87) PCT Pub. No.: WO2020/260243
PCT Pub. Date: Dec. 30, 2020

(65) Prior Publication Data
US 2022/0266794 A1   Aug. 25, 2022

(30) Foreign Application Priority Data
Jun. 26, 2019   (DE) ................... 10 2019 209 240.3

(51) Int. Cl.
*B60R 25/10*   (2013.01)
*B60R 25/24*   (2013.01)
(Continued)

(52) U.S. Cl.
CPC .......... *B60R 25/1018* (2013.01); *B60R 25/24* (2013.01); *B60R 25/34* (2013.01); *G07C 2009/00587* (2013.01)

(58) Field of Classification Search
CPC ..... B60R 25/1018; B60R 25/24; B60R 25/34; G07C 2009/00587
See application file for complete search history.

(56) References Cited

U.S. PATENT DOCUMENTS

| 5,552,641 | A | | 9/1996 | Fischer et al. ............... 307/10.5 |
| 5,736,793 | A | * | 4/1998 | Jahrsetz ................... H02J 9/06 |
| | | | | 307/66 |

(Continued)

FOREIGN PATENT DOCUMENTS

| CN | 103249605 A | 8/2013 |
| CN | 105389867 A | 3/2016 |

(Continued)

OTHER PUBLICATIONS

German Office Action, Application No. 102019209240.3, 7 pages, dated Feb. 3, 2020.

(Continued)

*Primary Examiner* — Thomas D Alunkal
(74) *Attorney, Agent, or Firm* — Slayden Grubert Beard PLLC

(57) ABSTRACT

An electronic door locking system of a motor vehicle is disclosed, comprising at least one receiver for the transmission signals of an electronic key, at least one control device for mechanically locking and unlocking at least one motor vehicle door, at least one contact element, accessible from outside the motor vehicle, for connecting an external voltage source, wherein the at least one control device for mechanically locking and unlocking at least one motor vehicle door and/or at least one additional control device has an emergency power supply algorithm, wherein the electronic door locking system is designed to detect an emergency power supply mode and to activate the emergency power supply algorithm, wherein the emergency power supply algorithm is designed to deactivate at least one function of a normal (Continued)

mode and/or, in the case of a function, to access previously defined data of deactivated components or to ignore said data.

15 Claims, 2 Drawing Sheets

(51) Int. Cl.
*B60R 25/34* (2013.01)
*G07C 9/00* (2020.01)

(56) References Cited

U.S. PATENT DOCUMENTS

| | | | | |
|---|---|---|---|---|
| 6,056,076 | A | * 5/2000 | Bartel | E05B 81/54 |
| | | | | 180/271 |
| 6,211,681 | B1 | 4/2001 | Kagawa et al. | 324/426 |
| 9,600,947 | B2 | * 3/2017 | Obergfell | B60R 25/24 |
| 9,909,344 | B2 | * 3/2018 | Krishnan | B60R 25/403 |
| 2011/0043355 | A1 | * 2/2011 | Chander | B60K 15/05 |
| | | | | 320/109 |
| 2012/0268068 | A1 | * 10/2012 | Jung | B60R 16/03 |
| | | | | 320/109 |
| 2013/0173102 | A1 | * 7/2013 | Aldighieri | B60L 50/60 |
| | | | | 903/903 |
| 2018/0022227 | A1 | * 1/2018 | Foldesi | H02J 3/322 |
| | | | | 307/10.1 |

FOREIGN PATENT DOCUMENTS

| | | |
|---|---|---|
| CN | 108206581 A | 6/2018 |
| DE | 3436761 A1 | 3/1986 |
| DE | 9419346 U1 | 2/1995 |
| DE | 4329697 A1 | 3/1995 |
| DE | 4404501 A1 | 8/1995 |
| DE | 19530721 A1 | 2/1997 |
| DE | 10049321 A1 | 4/2002 |
| DE | 102015213984 A1 | 1/2017 |
| DE | 102018212407 B3 | 9/2019 |
| DE | 102019209240 A1 | 12/2020 |
| WO | 2020/260243 A1 | 12/2020 |

OTHER PUBLICATIONS

International Search Report and Written Opinion, Application No. PCT/EP2020/067437, 8 pages, dated Sep. 18, 2020.

* cited by examiner

ELECTRONIC DOOR LOCKING SYSTEM

CROSS-REFERENCE TO RELATED APPLICATIONS

This application claims priority to German Patent Application No. DE 10 2019 209 240.3, filed on Jun. 26, 2019 with the German Patent and Trademark Office. The contents of the aforesaid patent application are incorporated herein for all purposes.

TECHNICAL FIELD

The invention relates to an electronic door locking system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In motor vehicles, the doors are often equipped with a central locking mechanism, wherein the locks of the doors may be operable remotely via infrared or RF radiation by means of an electronic key to increase convenience. Usually, the motor vehicle door is provided with an additional mechanical lock that may be actuated by means of an associated mechanical key if the electronic key fails. This failure may take place either due to an empty onboard electrical system battery or due to an empty battery within the electronic key. The onboard electrical system battery may serve to supply a door control device with a receiving apparatus for the transmission signal of the electronic key in order to subsequently activate the central locking mechanism. The additional battery within the electronic key serves to emit the transmitting power of the key.

In the known systems, if one of these batteries fails, the motor vehicle door must be actuated with the additional mechanical key.

SUMMARY

A need exists for improving an electronic door locking system with contact elements, accessible from outside the motor vehicle, for connecting an external voltage source.

The need is addressed by means of an electronic door locking system having the features of the independent claim(s). Embodiments of the invention are described in the dependent claims, the following description, and the drawings.

DESCRIPTION

Figure 1:
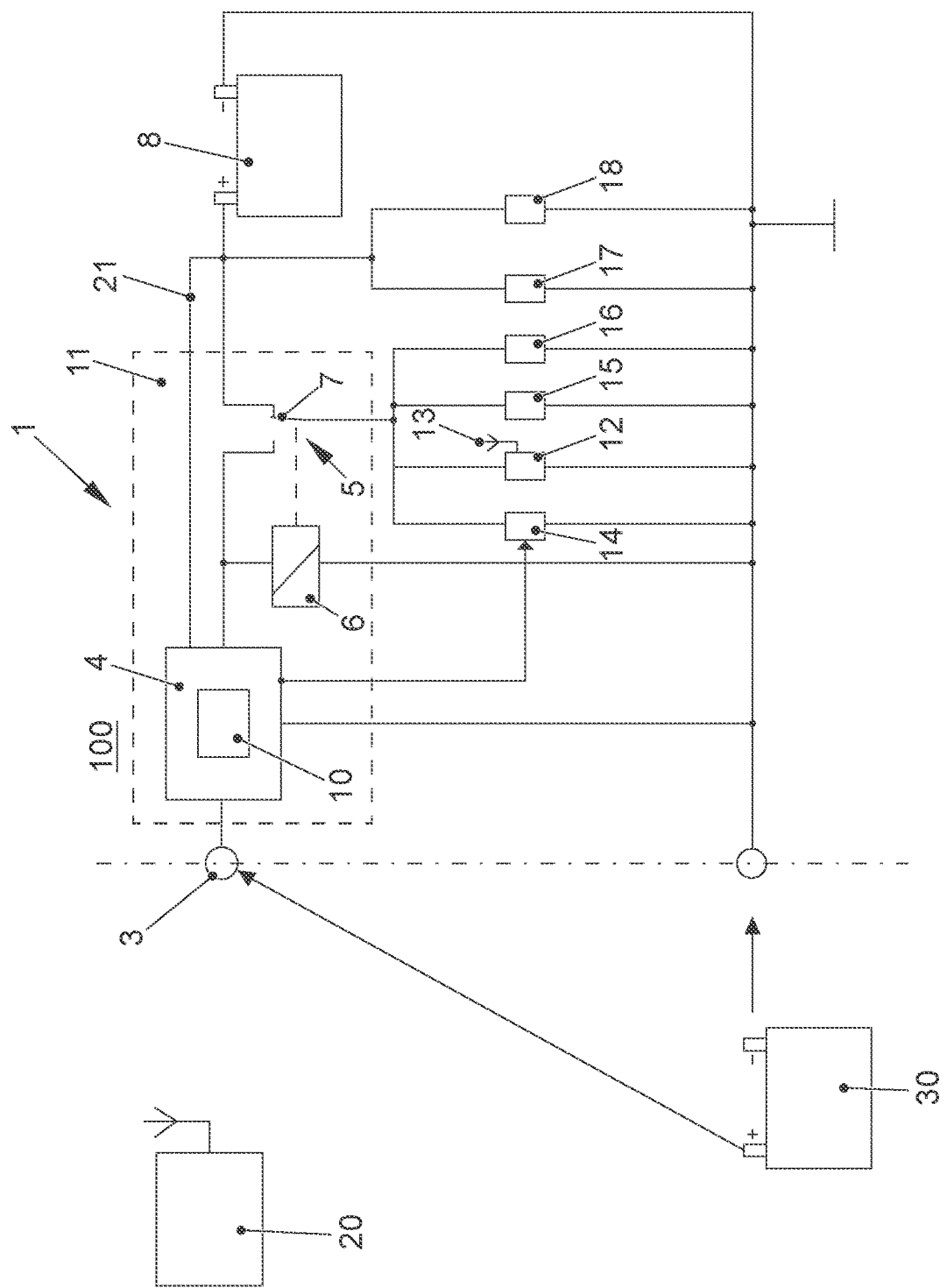
FIG. 1 shows an electronic door locking system according to a first embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the electronic door locking system of a motor vehicle comprises at least one receiver for transmission signals of an electronic key, at least one control device for mechanically locking and unlocking at least one motor vehicle door, and at least one contact element, accessible from outside the motor vehicle, for connecting an external voltage source, wherein the at least one control device for electromechanically locking and unlocking at least one motor vehicle door and/or at least one additional control device has an emergency power supply algorithm, wherein the electronic door locking system is designed to detect an emergency power supply mode and activate the emergency power supply algorithm. The emergency power supply algorithm is designed to then deactivate at least one function of a normal mode and/or to access previously defined data of deactivated components in the case of at least one function or to ignore the data of the deactivated components when executing a function. As a result, the necessary current needed for the emergency power supply mode may be considerably reduced so that, for example, necessary line cross-sections may be reduced accordingly. Thus, components (actuators, sensors, control devices, etc.) that are not required for the emergency unlocking may first be deactivated. In addition, however, individual functions of a component that is activated in the emergency power supply mode may also be deactivated. If, for example, a component is required for the unlocking (e.g., the control device for the locking and unlocking), it may thus be activated, but functions that are not necessary for this, such as the electrical window lift function, may be deactivated, which saves energy. To do this, no changes to the control device or its wiring are then necessary on the hardware side. By accessing previously defined data, components may be deactivated from which data is required in the normal mode but which are not imperative for the emergency unlocking.

Alternatively, the function may be designed in the emergency power supply mode such that the data of the deactivated component (e.g., gear control device) may be omitted.

The emergency power supply algorithm may then be understood as a special software mode.

In some embodiments, the electrical door locking system is designed to detect a voltage at the at least one contact element and to generate an activation signal for the emergency power supply mode. If multiple contact elements are present, the signals may be logically combined, for example, by an AND or OR operation.

In some embodiments, at least one control device is designed to change to an emergency power supply mode based on a bus communication and to activate the at least one emergency power supply algorithm. In this case, for example, only the required control devices are connected to the at least one contact element with separate lines. During the communication, the at least one control device then determines that only specific control devices are present, so the emergency power supply mode may be changed to.

In some embodiments, the electrical door locking system has at least one switch element and a control unit which is connected to the contact element and an onboard electrical system battery, wherein the control unit is designed to switch the switch element to a first switching position or a second switching position depending on the voltage level at the contact element and the onboard electrical system battery, wherein the contact element is decoupled from the onboard electrical system of the motor vehicle in the first switching position and at least the onboard electrical system consumers necessary for the locking and unlocking are connected to the contact element and decoupled from the onboard electrical system battery in the second switching position. This increases the security, since switching to the contact element is only possible depending on a voltage level at the onboard electrical system battery, meaning when its voltage falls below a threshold. This prevents the contact element from being able to be used for manipulations, for example an unauthorized energy removal or causing an intentional short-circuit, when the onboard electrical system battery is sufficiently charged.

In some embodiments, the contact element is designed as a socket. Alternatively, the contact element is designed as a line end or contact pin such that an electrical connection may be established simply via a jumper cable.

In some embodiments, the deactivated function is an electrical window lift function.

In some embodiments, the deactivated component, the predefined data of which is used, is, for example, a gear control device. If, for example, a selection lever positioning signal is required for the locking function in the normal mode, such a value may be specified in a fixed manner, or unnecessary, for the emergency power supply mode so that the vehicle may be locked (after it has been previously unlocked) without the gear control device being activated.

In some embodiments, the electrical door locking system is designed such that only onboard electrical system consumers necessary for the locking and unlocking are connected to the contact element in the second switching position. This also reduces manipulation possibilities, wherein additionally the required current from the external voltage source is limited to a minimum.

In alternative embodiments, the onboard electrical system consumers of an electronic parking brake are additionally connected to the contact element so that, after entering the motor vehicle, the electronic parking brake may be released in order to tow the motor vehicle, in particular when no suitable external voltage source is present to charge the onboard electrical system battery or the onboard electrical system battery is defective.

In some embodiments, the control unit is designed to block or transform a voltage level that is unsuitable for the onboard electrical system. For example, it may be provided that the control unit has voltage limiters such as Zener diodes. The control unit may also have boost or buck converters or inverters. Alternatively, it may be provided that the switch element is not switched into the second switching position when the voltage level is unsuitable (e.g., a DC voltage that is too high).

In some embodiments, the control unit is designed with additional protective devices, such as filters, in order to prevent interference signals from being coupled in.

Alternatively or additionally, reversible or irreversible fuses may also be provided.

In some embodiments, the at least one switch element is designed as a relay so that a galvanic separation is established in the respective switching positions.

In some embodiments, the control unit is designed to switch back from the second switching position to the first switching position after a specified time. This also increases the security against manipulation attempts.

In some embodiments, at least one component is assigned a contact element for connecting an external current source, wherein electrical wiring is arranged on the component, which wiring deactivates a function of the component through the hardware.

The invention will be explained in the following in more detail with reference to further example embodiments.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In FIG. 1, an electronic door locking system 1 in a motor vehicle 100 is shown. The electronic door locking system 1 comprises a control device 12 for electromechanically locking and unlocking at least one motor vehicle door, wherein the control device 12 has a receiver 13 for the transmission signals of an electronic key 20 or such a receiver is assigned to the control device 12. For example, an onboard electrical system control device 14 is designed with the receiver 13 and transmits the signals to the control device 12 via a vehicle bus (e.g., CAN).

Furthermore, at least one contact element 3, which is accessible from outside the motor vehicle 100 and may be connected to an external voltage source 30, is provided. The at least one contact element 3 may be designed, for example, as a socket, jack or line end. Connected to the contact element 3 is a control unit 4 that controls a switch element 5 consisting of a coil 6 and a two-way switch 7. The switch element 5 may be switched to a first switching position or a second switching position, wherein the first switching position is shown in FIG. 1. In the first switching position, all onboard electrical system consumers are connected to an onboard electrical system battery 8. In addition to the aforementioned control device 12, these are, for example, an onboard electrical system control device 14, an electronic parking brake 15, and additional first consumers 16 that are necessary for locking and unlocking the motor vehicle door. Additional onboard electrical system consumers are, for example, a gear control device 17 and additional second consumers 18 that are not necessary for locking and unlocking the vehicle door.

In the event of a deep discharge, the onboard electrical system battery 8 may no longer sufficiently supply the onboard electrical system consumers, but also not the control device 12 or additional consumers 16 necessary for the locking and unlocking. In order to now still enable entry to the motor vehicle 100, the external voltage source 30 may be connected to the at least one contact element 3. The control unit 4 now detects a voltage at the contact element 3 and the voltage level of the onboard electrical system battery 8 (less than a threshold) via a measuring line 21 and subsequently controls the switch element 5 to the second switching position. In the second switching position, the control device 12, the onboard electrical system control device 14, the electronic parking brake 15, and the additional first consumers 16 are connected to the contact element 3 via the control unit 4. In this case, the switchover only takes place when a sufficient voltage is applied to the contact element 3 and the voltage of the onboard electrical system battery 8 is simultaneously below the threshold. In the control unit 4, a protective device 10 is arranged, which blocks, for example, overvoltages, excess currents, polarity reversals and/or high-frequency interference signals. By supplying the consumers necessary for the locking and unlocking, transmission signals of the electronic key 20 may now again be received and evaluated and the motor vehicle door may be unlocked after a positive result. The user may then get into the motor vehicle 100 and unlock, for example, the hood from inside so that the onboard electrical system battery 8 may be charged or a defective onboard electrical system battery 8 may be replaced. Control unit 4 and switch element 5 may be designed as a structural unit 11 and, for example, plugged into a fuse box. Thus, motor vehicles 100 may be very easily retrofitted, or different variants may be produced very easily during production.

Furthermore, an emergency power supply algorithm that, for example, deactivates the function of an electrical window lift may be saved in the control device 12. As a result, the feed line from the contact element 3 may be designed for low currents. Furthermore, when executing the emergency power supply algorithm during the locking of the vehicle door, a selection lever position, which is delivered in the normal mode by the gear control device 17, may be omitted as an input. Thus, the feed line may be designed for even lower currents.

The state of the emergency power supply mode may in this case be detected in various ways and transmitted to the control device 12. For example, the control unit 4 may detect the voltage at the contact element 3 and transmit it to the onboard electrical system control device 14 or the control device 12 via a signal line 19 or a bus line. If the information is transmitted to the onboard electrical system control device 14, it transfers the information further to the control device 12. Alternatively or additionally, one of the powered control devices 12, 14, 15 may change to the emergency power supply mode in the second switching position based on the bus communication when no messages are received from other bus participants. It is noted that the control devices 14 and 15 do not necessarily have to be supplied with voltage in the emergency power supply mode.

Figure 2:
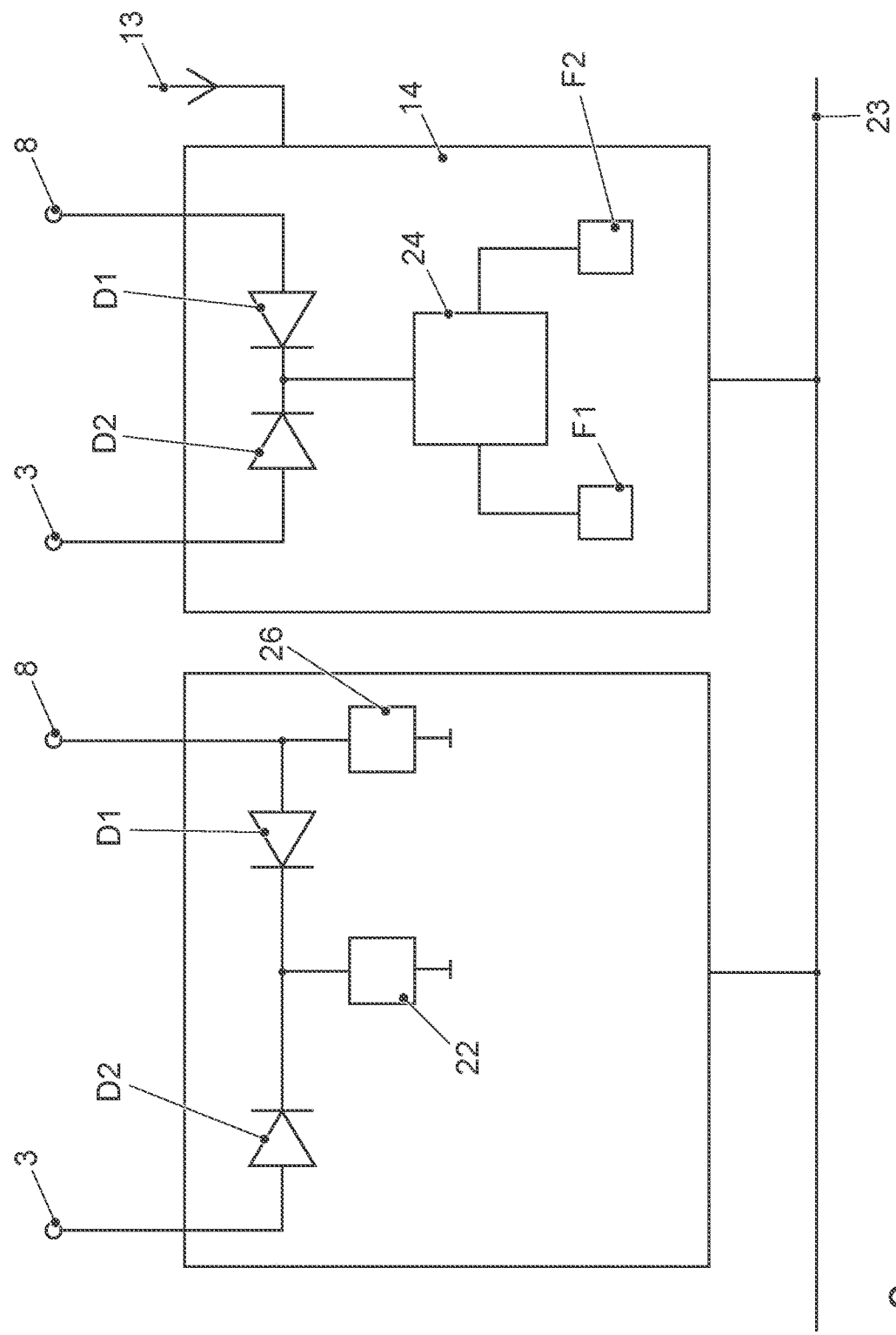
FIG. 2 shows an electronic door locking system according to a second embodiment.

An alternative embodiment is shown in FIG. 2, wherein only the control device 12 and the onboard electrical system control device 14 are shown. Here, furthermore, a first motor 26 for a window lift function and another motor 22 for locking and unlocking the vehicle door is shown. In this embodiment, the switch element 5 and the control unit 4, for example, may be omitted. For this purpose, the voltage inputs of the control devices 12, 14 are connected to the onboard electrical system battery 8 via a first diode D1 and to the at least one contact element 3 via a second diode D2.

The onboard electrical system control device 14 has the receiver 13. Furthermore, the onboard electrical system control device 14 has a control unit 24 on which the emergency power supply algorithm runs as software so that, for example, a function F1 is executed, but a function F2 of the normal mode is not executed in the emergency power supply mode.

When the onboard electrical system battery 8 fails and a first external voltage source 30 is connected to the contact element 3, the two control devices 12, 14 are supplied by the external voltage source 30, wherein the two diodes D1, D2, which are wired with opposite poles, decouple the discharged onboard electrical system battery 8. From the communication via the bus line 23, the control device 14 may then ascertain the emergency power supply mode and activate the emergency power supply algorithm so that the function F2 is deactivated.

In this embodiment, the functions are deactivated both in the software and in the hardware, since the first motor 26 for the window lift function is decoupled from the contact element 3 by the first diode D1.

LIST OF REFERENCE NUMERALS

1) Electronic door locking system
3) Contact element
4) Control unit
5) Switch element
6) Coil
7) Two-way switch
8) Onboard electrical system battery
10) Protective device
11) Structural unit
12) Control device
13) Receiver
14) Onboard electrical system control device
15) Electronic parking brake
16) Additional first consumers
17) Gear control device
18) Additional second consumers
19) Signal line
20) Electronic key
21) Measuring line
22) Motor for locking and unlocking the vehicle door
23) Bus line
24) Control unit
26) Motor for window lift function
30) External voltage source
100) Motor vehicle
D1) First diode
D2) Second diode
F1, F2 Function The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. An electronic door locking system of a motor vehicle, comprising at least one receiver for the transmission signals of an electronic key, at least one control device for electromechanically locking and unlocking at least one motor vehicle door, at least one contact element, accessible from outside the motor vehicle for connecting an external voltage source, at least one switch element, and a control unit; wherein one or more of the at least one control device and at least one additional control device has an emergency power supply algorithm, wherein the electronic door locking system is configured to detect an emergency power supply mode and to activate the emergency power supply algorithm; wherein the emergency power supply algorithm is configured to deactivate at least one function, which is available in a normal mode, of a component activated in the emergency power supply mode, and/or, in the case of a function, to access previously defined data of deactivated components in the emergency power supply mode in the emergency power supply mode or to ignore said data for the execution of the function in the emergency power supply mode when the data of the deactivated component is required to execute the function in a normal mode; wherein the control unit is connected to the contact element and an onboard electrical system battery; wherein the control unit is configured to switch the switch element to a second switching position from a first switching position responsive to detecting a voltage level at the onboard electrical system battery being at or below a predefined threshold and a voltage being present at the contact element; and wherein in the first switching position, the contact element is decoupled from the onboard electrical system of the motor vehicle, and in the second switching position, at least the onboard electrical system consumers necessary for the locking and unlocking are connected to the contact element and decoupled from the onboard electrical system battery.

2. The electronic door locking system of claim 1, wherein the electronic door locking system is configured to detect a voltage at the at least one contact element and to generate an activation signal for the emergency power supply algorithm.

3. The electronic door locking system of claim 1, wherein at least one control device is configured to change to an emergency power supply mode based on a bus communication and to activate the at least one emergency power supply algorithm.

4. The electronic door locking system of claim 1, wherein the deactivated function is an electrical window lift function.

5. The electronic door locking system of claim 1, wherein the deactivated component is a gear control device.

6. The electronic door locking system of claim 1, wherein the only the onboard electrical system consumers necessary for the locking and unlocking and the onboard electrical system consumers of an electronic parking brake are connected to the contact element.

7. The electronic door locking system of claim 1, wherein the control unit is configured to block or transform a voltage level that is unsuitable for the onboard electrical system.

8. The electronic door locking system of claim 1, wherein at least one component is assigned a contact element for connecting an external voltage source, wherein electrical wiring is arranged on the component, which wiring deactivates a function of the component through the hardware.

9. The electronic door locking system of claim 2, wherein at least one control device is configured to change to an emergency power supply mode based on a bus communication and to activate the at least one emergency power supply algorithm.

10. The electronic door locking system of claim 2, wherein the deactivated function is an electrical window lift function.

11. The electronic door locking system of claim 3, wherein the deactivated function is an electrical window lift function.

12. The electronic door locking system of claim 2, wherein the deactivated component is a gear control device.

13. The electronic door locking system of claim 3, wherein the deactivated component is a gear control device.

14. The electronic door locking system of claim 4, wherein only the onboard electrical system consumers necessary for the locking and unlocking and the onboard electrical system consumers of an electronic parking brake are connected to the contact element.

15. The electronic door locking system of claim 5, wherein only the onboard electrical system consumers necessary for the locking and unlocking and the onboard electrical system consumers of an electronic parking brake are connected to the contact element.

* * * * *